3,464,998
ADAMANTYL ESTERS AND AMIDES OF
PYRIDINECARBOXYLIC ACIDS
Carl Peter Krimmel, Wauconda, Ill., assignor to G. D.
Searle & Co., Chicago, Ill., a corporation of Delaware
No Drawing. Filed Mar. 4, 1968, Ser. No. 709,865
Int. Cl. C07d 31/36; A61k 27/00; A01n 9/22
U.S. Cl. 260—295.5
5 Claims

ABSTRACT OF THE DISCLOSURE

Adamantyl and adamantylalkyl esters and amides of pyridinecarboxylic acids are described herein. They possess antiulcer, antibradykinin, antifungal, antibacterial, and antiprotozoal activity. The compounds are prepared from the appropriate pyridinecarbonyl chloride and the appropriate adamantane alcohol or amine.

SUMMARY OF THE INVENTION

The present invention relates to a group of compounds containing both the pyridine and the adamantane structures. More particularly, it relates to a group of amides and esters having the following general formula

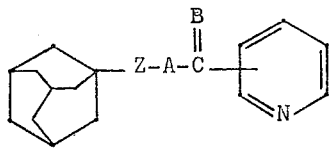

wherein A is selected from the group consisting of O and NH; B is selected from the group consisting of O and S; and Z is selected from the group consisting of a bond and lower alkylene. The lower alkylene radicals referred to above contain up to 6 carbon atoms and can be exemplified by methylene, ethylene, propylene, trimethylene, tetramethylene, and hexamethylene.

The organic bases of this invention form pharmaceutically acceptable salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric hydrohalic, and aromatic sulfonic acids. Among such esters are methyl bromide and iodide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of the present invention are conveniently prepared by the reaction of an adamantane amine or alcohol with the approprate pyridinecarbonyl halide. The pyridinecarbonyl chloride is preferred for this reaction and the reaction is carried out in a basic or an inert solvent. Pyridine is particularly useful solvent for this purpose.

The thioamides of the present invention are conveniently prepared by the reaction of the appropriate carboxamide with phosphorus pentasulfide. The reaction is carried out in an inert solvent and pyridine is particularly useful for this purpose.

The compounds of the present invention are useful because of their pharmacological properties. In particular, the present compounds possess activity as antiulcer agents, antibradykinin agents, and anti-inflammatory agents. The last activity is demonstrated by a phenylbutazone-like effect on edematous conditions.

The antiulcer activity of the present compounds can be demonstrated by their ability to inhibit ulceration in the Shay rat. The ulceration occurs in rats subjected to fasting and pyloric ligation as reported by Shay et al., Gastroenterology, 5, 43 (1945). In the test, male Charles River rats weighing 200–250 grams and fasted 72 hours prior to ligation are used. Immediately following ligation, the prescribed dose of compound dissolved or suspended in 1.0 ml. of pH 2.0 hydrochloric acid is intragastrically administered to each of a group of 6 animals. A like group of animals receives the acid alone and serves as controls. Precisely 19 hours later, the stomachs of surviving animals are excised and examined under 5× magnification. Any ulcers present are rated according to number and size and a compound found to produce a significant decrease in ulceration compared to the control animals is rated as active. When 1-nicotinoylaminomethyladamantane was tested at 50 mg. according to this procedure, it produced a significant decrease in ulceration.

The present compounds also possess antibiotic activity against a variety of organisms. Thus, they inhibit the growth of bacteria such as *Diplococcus pneumoniae*, *Bacillus subtilis*, and *Escherichio coli*, fungi such as *Trichophyton mentagrophites*, and protozoa such as *Tetrahymena gelleii* and *Trichomonas vaginalis*. The present compounds can thus be combined with various known excipients and adjuvants in the form of dusts, solutions, suspensions, ointments, and sprays to provide compositions useful for disinfecting purposes. The present compounds have also been found to inhibit germination of seeds of trifolium.

The following examples are presented to illustrate the present invention; they should not be construed as limiting it in spirit or in scope. In these examples, quantities by weight are indicated in grams, quantities by volume are indicated in milliliters, and temperatures are indicated in degrees centigrade (° C.).

EXAMPLE 1

A mixture of 24.6 grams of nicotinic acid and 80 ml. of thionyl chloride is refluxed on a steam bath for 2 hours. The mixture is then heated on a steam bath under reduced pressure to remove unreacted thionyl chloride. Azeotropically dried benzene is added to the mixture and distillation is resumed to remove the final traces of thionyl chloride with the benzene. The residual nicotinoyl chloride hydrochloride is then dissolved in 150 ml. of anhydrous pyridine. To this solution there is added, slowly and with stirring, a solution of 35.5 grams of 1-adamantanamine in 150 ml. of anhydrous pyridine. The resultant mixture is heated on a steam bath for 1 hour and then allowed to stand at room temperature for 16 hours. A crystalline deposit which forms is removed by filtration and the resulting filtrate is poured into 800 ml. of water. A copious white precipitate forms and this is separated by filtration, washed with water, and then dried in a steam cabinet. The white microcrystalline product obtained in this way is 1-nicotinoylaminoadamantane melting at about 164–167° C. This compound has the following formula

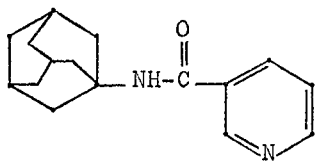

The addition of 1 mg. of this compound to an agar plate inoculated with *Bacillus subtilis* inhibits the growth of this organism.

EXAMPLE 2

A solution of 0.5 gram of 1-nicotinoylaminoadamantane, 2.0 grams of methyl iodide, and 5.0 ml. of 2-butanone is refluxed on a steam bath for 1 hour. The reaction mixture is cooled and the precipitate which forms is separated by filtration and washed with 2-butanone. The powdery yellow solid is then dried in a steam cabinet to give 1-nicotinoylaminoadamantane methiodide melting at about 216–221° C.

EXAMPLE 3

A solution of 12.8 grams of 1-nicotinoylaminoadamantane, 4.4 grams of phosphorus pentasulfide, and 150 ml. of anhydrous pyridine is refluxed for 1 hour. The mixture is then cooled to room temperature and poured into 1500 ml. of cold water. The yellow precipitate which forms is separated by filtration, washed with water, and dried in a steam cabinet. The solid is then mixed with 1500 ml. of benzene and refluxed. Insoluble material is removed by hot filtration and the filtrate is concentrated to a volume of 400 ml. The concentrate is cooled and the precipitate which forms is separated by filtration and dried in a steam cabinet. The product obtained in this way is 1-thionicotinoylaminoadamantane melting at about 236–239° C.

EXAMPLE 4

6.2 grams of isonicotinic acid is converted to isonicotinoyl chloride hydrochloride according to the procedure for the preparation of nicotinoyl chloride hydrochloride described in Example 1. The resulting acid chloride is dissolved in 60 ml. of anhydrous pyridine and to this solution there is added, with stirring, a solution of 7.6 grams of 1-adamantanamine in 60 ml. of anhydrous pyridine. The resultant mixture is then heated on a steam bath for 1 hour and the pyridine is removed by distillation under reduced pressure. The crystalline residue which results is mixed with about 200 ml. of cold water and filtered. The precipitate is washed once with water and dried in a steam cabinet. It is then recrystallized by dissolving it in 150 ml. of hot 2-propanol, treating the solution with charcoal, and diluting the resultant filtrate with 200 ml. of water. The precipitate which forms is separated by filtration and recrystallized from heptane to give 1-isonicotinoylaminoadamantane melting at about 129–132° C.

EXAMPLE 5

A solution of 3.0 grams of 1-isonicotinoylaminoadamantane, 2.2 grams of phosphorus pentasulfide, and 40 ml. of anhydrous pyridine is refluxed for 1 hour. The resultant mixture is cooled and then poured into 400 ml. of cold water. A bright yellow precipitate forms. This is separated by filtration, washed with water, and dried in a steam cabinet. The solid is then heated with 1000 ml. of refluxing benzene, filtered to remove some insoluble solid, concentrated, and then cooled. The bright yellow precipitate which forms is separated by filtration to give 1-thioisonicotinoylaminoadamantane melting at about 239–242° C. This compound has the following formula

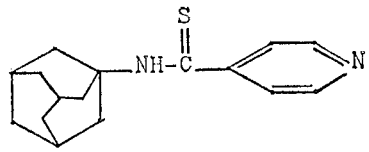

EXAMPLE 6

Nicotinoyl chloride hydrochloride is prepared from 3.7 grams of nicotinic acid according to the procedure described in Example 1. The acid chloride is then dissolved in 30 ml. of anhydrous pyridine and to the resulting solution is added, with stirring, a solution of 1-adamantanemethylamine in 30 ml. of anhydrous pyridine. The mixture is then heated on a steam bath for 1 hour and the pyridine is removed under reduced pressure. The resulting solid residue is mixed with water and then filtered and the solid is washed with water and dried in a steam cabinet. It is then dissolved in 150 ml. of anhydrous 2-propanol, treated with charcoal, and filtered. The hot filtrate is diluted with 310 ml. of water and allowed to stand. The crystalline precipitate which forms is separated by filtration and dried in a steam cabinet to give 1-nicotinoylaminomethyladamantane melting at about 124–127° C.

EXAMPLE 7

The procedure of Example 6 is repeated using an equivalent quantity of 1-adamantaneethylamine in place of the 1-adamantanemethylamine. The product obtained in this way is 1-[2-(nicotinoylamino)ethyl]adamantane.

EXAMPLE 8

3.1 grams of nicotinic acid is converted to the corresponding acid chloride hydrochloride according to the procedure described in Example 1. To a solution of this acid chloride in 10 ml. of anhydrous pyridine there is added a solution of 4.1 grams of 1-adamantanemethanol in 10 ml. of anhydrous pyridine. The resulting reaction mixture is refluxed and stirred for 2 hours. The mixture is then cooled and the solid which forms is separated by filtration and discarded. The filtrate is extracted with dilute hydrochloric acid and the benzene solution which remains is dried over calcium chloride. The solvent is then evaporated and the residual oil crystallizes on standing. The solid is dissolved in 50 ml. of heptane at room temperature, treated with charcoal, and filtered. The resultant filtrate is cooled in a Dry Ice-acetone bath and the precipitate which forms is separated by filtration and air dried to give 1-adamantylmethyl nicotinoate melting at about 51–54° C. The addition of 5 mg. of this compound to an agar plate inoculated with *Diplococcus pneumoniae* inhibits the growth of this organism.

What is claimed is:

1. A member selected from the group consisting of compounds of the formula

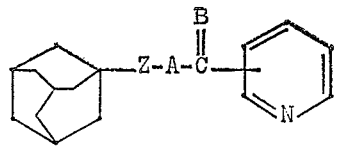

wherein A is selected from the group consisting of O and NH; B is selected from the group consisting of O and S; and Z is selected from the group consisting of a bond and lower alkylene; and the acid addition and alkyl halide quaternary ammonium salts thereof.

2. A compound according to claim 1 which is 1-nicotinoylaminoadamantane.

3. A compound according to claim 1 which is 1-nicotinoylaminoadamantane methiodide.

4. A compound according to claim 1 which is 1-nicotinoylaminomethyladamantane.

5. A compound according to claim 1 which is 1-adamantylmethylnicotinoate.

References Cited

Stepanov et al.: Chemical Abstracts, vol. 65, par. 627 (1966).

HENRY R. JILES, Primary Examiner

ALAN L. ROTMAN, Assistant Examiner

U.S. Cl. X.R.

260—294.8, 295; 424—266, 325